(12) United States Patent
Ramsundar

(10) Patent No.: US 11,118,697 B2
(45) Date of Patent: Sep. 14, 2021

(54) INFLATABLE SEAL SYSTEM WITH RETRACTABLE LOAD BEARING FEATURE

(71) Applicant: Pallant Satnarine Ramsundar, Chester, VA (US)

(72) Inventor: Pallant Satnarine Ramsundar, Chester, VA (US)

( * ) Notice: Subject to any disclaimer, the term of this patent is extended or adjusted under 35 U.S.C. 154(b) by 200 days.

(21) Appl. No.: 16/524,129

(22) Filed: Jul. 28, 2019

(65) Prior Publication Data

US 2021/0025510 A1 Jan. 28, 2021

(51) Int. Cl.
*F16K 15/20* (2006.01)
*F16K 7/10* (2006.01)
*F16K 5/06* (2006.01)

(52) U.S. Cl.
CPC .......... *F16K 15/205* (2013.01); *F16K 5/0689* (2013.01); *F16K 7/10* (2013.01)

(58) Field of Classification Search
CPC ........ F16K 15/205; F16K 5/0689; F16K 7/10; F16K 15/20; F16K 15/202; A63B 41/00; B60C 23/10; B60C 29/06; B65D 81/052; F16J 15/40; F16J 15/46; F16J 15/48; F16J 15/54
USPC ......... 137/223, 224, 225; 277/583, 605, 646
See application file for complete search history.

(56) References Cited

U.S. PATENT DOCUMENTS

| | | | | |
|---|---|---|---|---|
| 2,720,011 A * | 10/1955 | Krupp | ...... | F16J 15/46 49/477.1 |
| 3,325,042 A * | 6/1967 | Brown | ...... | F16J 15/46 220/232 |
| 3,591,963 A * | 7/1971 | Kopp | ...... | F02C 7/04 60/801 |
| 3,689,082 A * | 9/1972 | Satterthwaite | ...... | F16L 17/10 277/346 |
| 4,086,806 A * | 5/1978 | Covey, III | ...... | F16J 15/46 277/605 |
| 4,109,922 A * | 8/1978 | Martin | ...... | B23K 15/06 277/646 |
| 4,198,064 A * | 4/1980 | Huhn | ...... | F16J 15/3204 277/558 |
| 4,313,609 A * | 2/1982 | Clements | ...... | B65D 90/08 277/641 |
| 4,333,662 A * | 6/1982 | Jones | ...... | E03F 5/021 277/605 |
| 4,394,022 A * | 7/1983 | Gilmore | ...... | F16J 15/02 277/377 |
| 4,508,355 A * | 4/1985 | Ditcher | ...... | E03F 3/04 277/605 |
| 4,821,536 A * | 4/1989 | Bardsley | ...... | B01D 33/073 277/387 |
| 5,114,162 A * | 5/1992 | Ditcher | ...... | F16L 41/088 277/605 |
| 6,213,450 B1 * | 4/2001 | Palmer | ...... | F16K 5/205 137/15.06 |

\* cited by examiner

*Primary Examiner* — Justin M Jonaitis

(57) ABSTRACT

An inflatable seal system with retractable load bearing feature providing sealing in the annulus between a ball inside a pipe, with minimal pressure applied to inflate the inflatable seal, by using a retractable load bearing construct to hold the ball in place against the high-pressure forces in the pipe.

11 Claims, 4 Drawing Sheets

INFLATABLE SEAL SYSTEM WITH RETRACTABLE LOAD BEARING FEATURE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF THE INVENTION

This invention is in the area of seals used to control fluid flow in the annulus between two objects. More specifically, this invention relates to inflatable seals being used to control fluid flow in the annulus created between a ball in a pipe.

BACKGROUND OF THE INVENTION

The use of a ball to control fluid flow in a pipe is commonly used, as for instance, in a ball valve. Typically, the ball is supported by a solid seat, with a seal in between the ball and the seat, to prevent fluid leakage. The seat of the ball valve bears the load of the fluid pressure in the pipe and keeps the ball in place. In the particular case where there is no seat, and the ball is smaller than the bore of the pipe, the seal alone must withstand the load due to the fluid pressure in the pipe, to hold the ball in place. When an inflatable seal is used in this latter situation, very high pressures are required to inflate the seal to be able to hold the ball in place against the fluid pressure in the pipe. This invention describes an inflatable seal system, which utilizes a seal construct called a 'Load Support', integrated in the seal, to hold a floating ball in place requiring inflation pressures only sufficient to expand the inflatable seal and not significantly contributing to holding the ball in place against the fluid pressure inside the pipe.

BRIEF SUMMARY OF THE INVENTION

The present invention is an inflatable seal system to control fluid flow in the annulus formed between a ball inside a pipe, with the ball being of smaller diameter than the bore of the pipe, and requiring relatively low inflation pressures sufficient only to expand the inflatable seal.

In one aspect of the invention, the inflatable seal, made of flexible material, has a hollow cavity. The introduction of compressed air or another pressurized fluid into the hollow cavity of the seal, causes it to expand, sealing any gaps in the annulus.

In another aspect of the invention, the inflatable seal has a sufficiently large block of material projecting from the seal, called a 'Load Support', that unfolds when the inflatable seal is inflated, to support the ball against fluid pressure in the pipe. Without this 'Load Support' feature, much higher inflation pressures for the seal would be required to hold the ball in place and effect sealing.

In another aspect of the invention, when uninflated, the inflatable seal collapses, allowing fluid flow in the pipe as well as unrestricted movement of the ball in the pipe.

DETAILED DESCRIPTION OF THE INVENTION

This invention enables an inflatable seal to maintain a seal in the annulus between a ball inside a pipe, utilizing a retractable load bearing element, called a 'Load Support', to bear most of the load due to the fluid pressure inside the pipe. The fluid used to expand the inflatable seal consequently does not need a high pressure to hold the ball in place, offering benefits of energy saving, reliability and simplicity.

Figure 1:
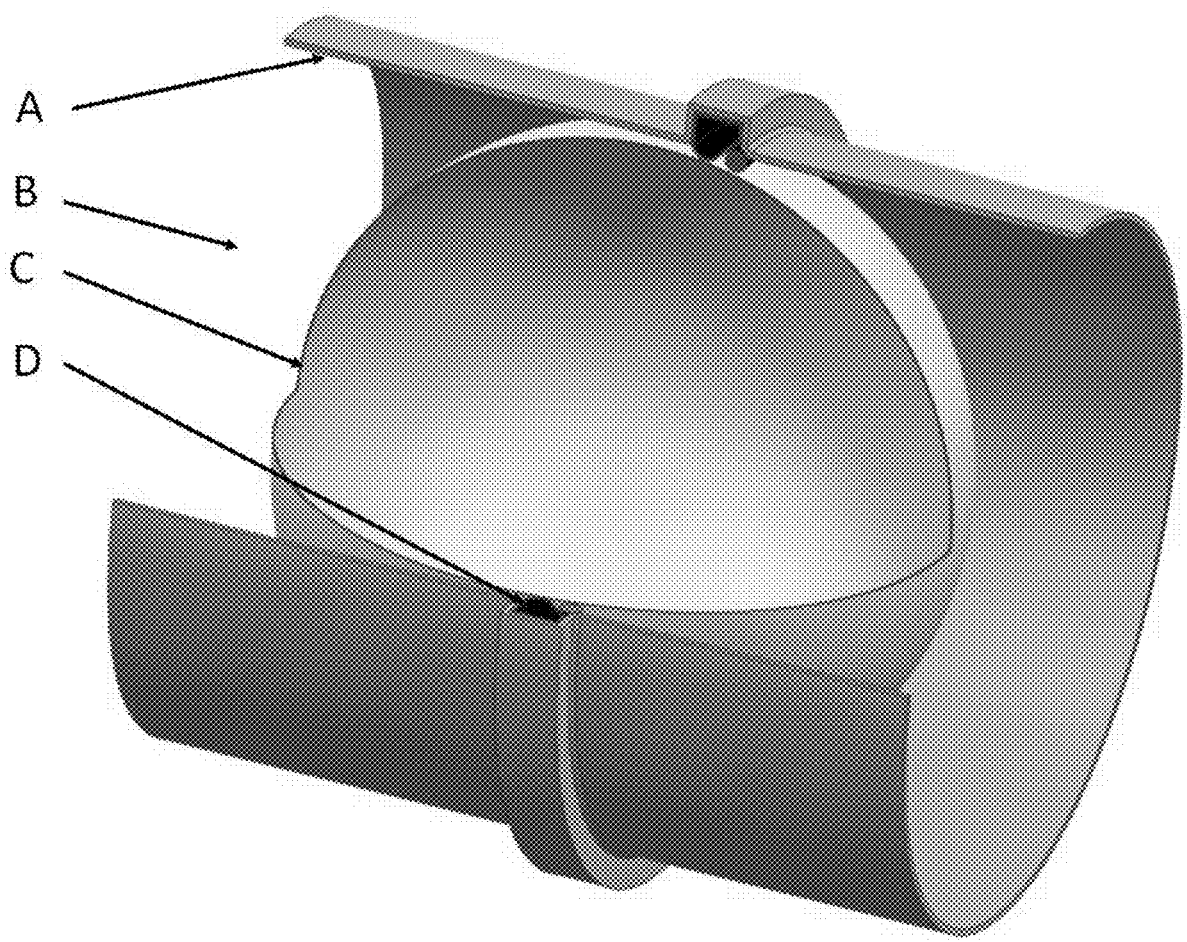
FIG. 1 gives a cut-away 3-D view of the working components of the invention utilizing a spherical ball in a pipe.

FIG. 1 shows an overview of the components of the invention. A is the Pipe with a profile to firmly retain the Inflatable Seal D. C is the Ball that forms an annulus with the A. Illustrated in this configuration, C is spherical in shape. B shows the direction of the fluid flowing in the Pipe.

Figure 2:
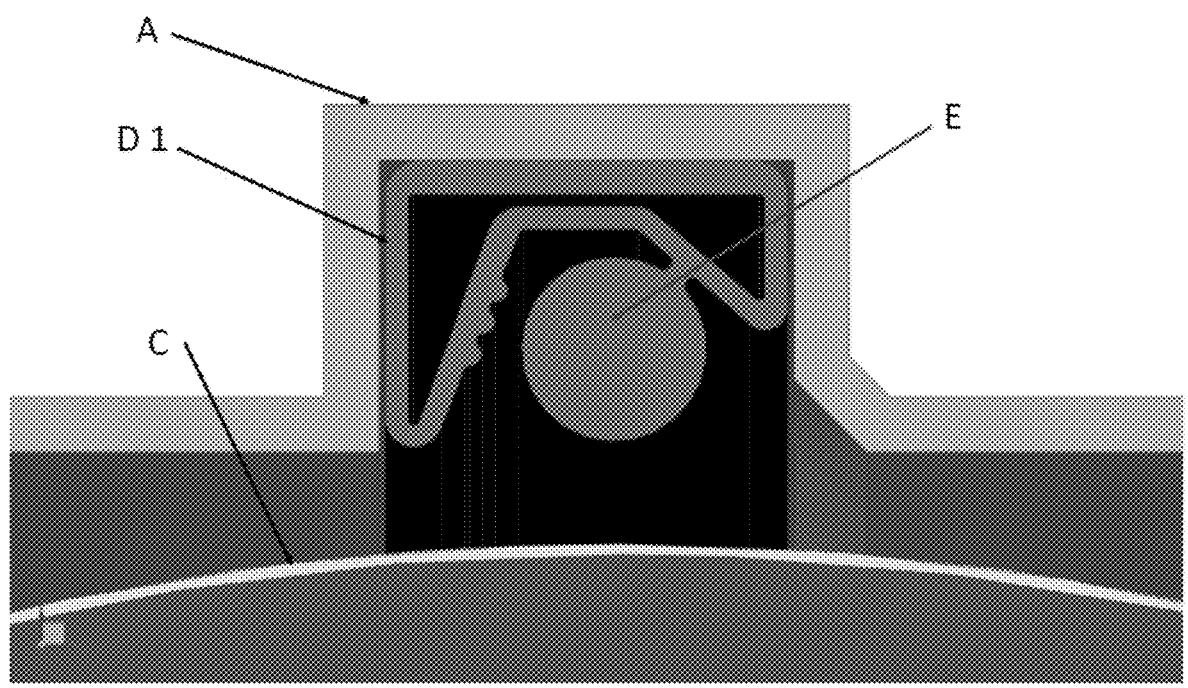
FIG. 2 shows a sectional detail of the Inflatable Seal System in the uninflated position for the spherical ball in a pipe.

FIG. 2 shows a detail of the cross section of the system shown in FIG. 1 with the Seal in the uninflated state D1. The Seal has a hollow cavity into which fluid under pressure is introduced to expand the Seal. Not shown is the port though which pressurize fluid is introduced to inflate the seal. When D is in the uninflated state, the Inflatable Seal offers no obstruction to the Ball moving in the Pipe, or fluid flowing in the Pipe. The detail shows a large block of material E, called the 'Load Support' that projects from the surface of the seal. In the uninflated state, E is retracted and does not project into the inner diameter of the Pipe, or obstruct movement of the Ball.

Figure 3:
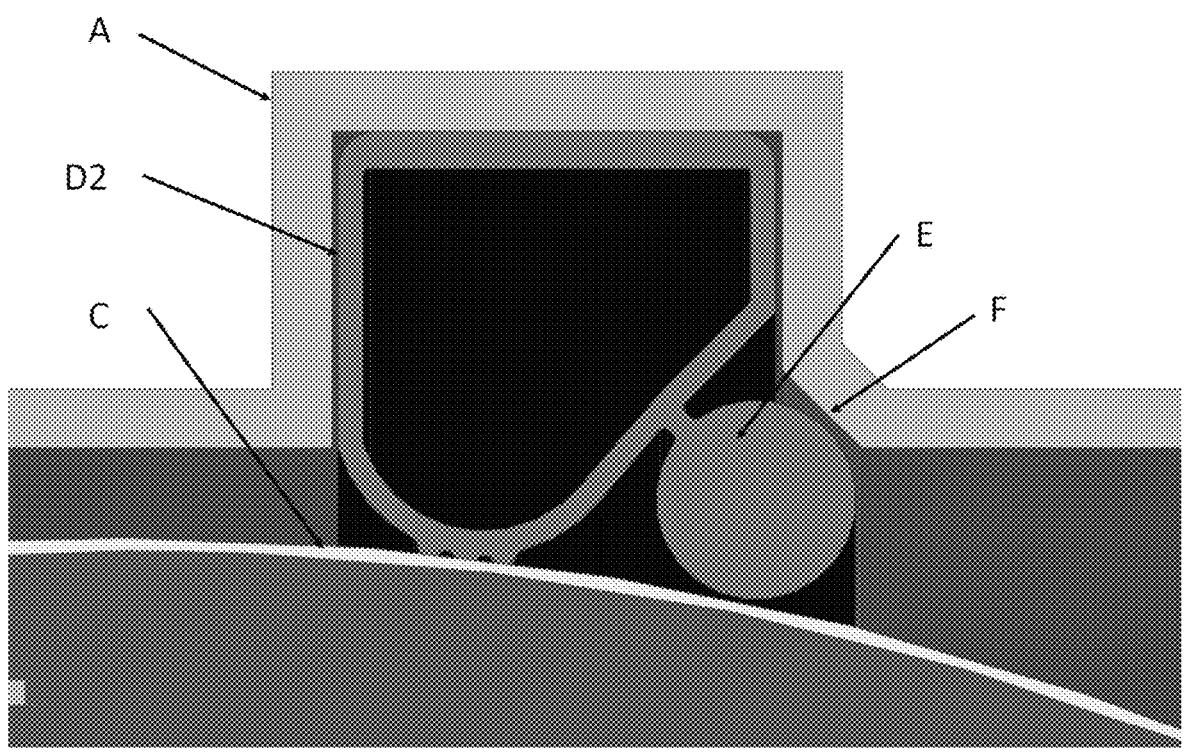
FIG. 3 shows a sectional detail of the Inflatable Seal System in the inflated position for the spherical ball in a pipe.

FIG. 3 shows a detail of the cross section of the system shown in FIG. 1 with the Seal in the inflated state D2. Here E is pushed out into the cavity of the Pipe and sits on the relief F. E is shown here as circular, but its profile can be varied together with the profile of F to permit better seating. If required also, partial cuts into the cross-section of E can be made around the periphery, to permit flexibility when transitioning from the uninflated to the inflated state and vice versa. In the inflated state, E blocks movement of the Ball and withstands the forces trying to push the Ball through A due to pressure of the fluid flowing in direction B. The inflated Seal thus seals off the annulus with the bulk of the load on the seal taken by E being squeezed between C and F. The pressure of the fluid required to inflate the Seal need only be sufficient to inflate the Seal and does not contribute significantly to retaining the Ball in position.

Figure 4:
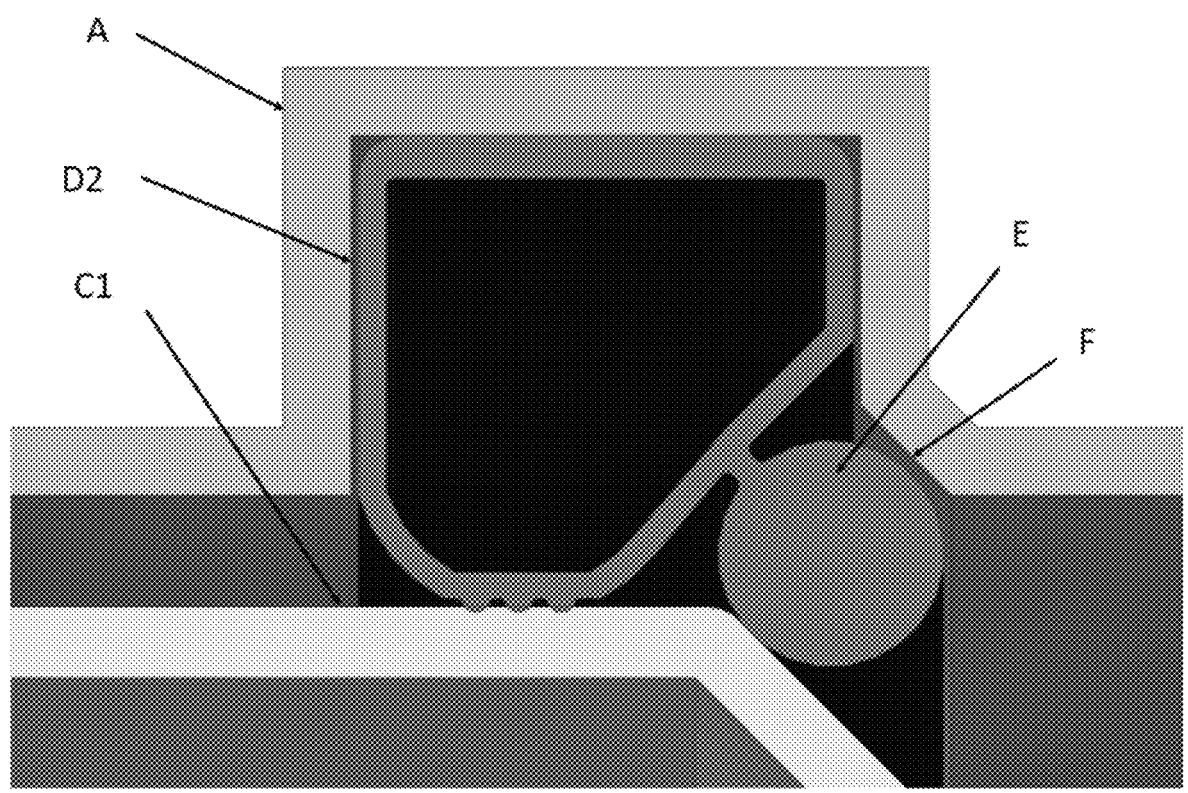
FIG. 4 shows a sectional detail of the Inflatable Seal System in the inflated position using a cylindrical ball in a pipe.

FIG. 4 shows a cross section of the system, with D in the inflated position, utilizing a Cylindrically Shaped Ball Cl, to illustrate the operation of the system with differing Ball profiles.

The advantages of the present invention, without limitation, are:

a) It allows an inflatable seal to seal against high pressure flows without requiring high pressures to inflate the seal, resulting in energy and cost savings.

b) In the uninflated position, it allows free movement of the ball and fluid in the Pipe.

c) It provides a strong and reliable sealing solution.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

The invention claimed is:

1. A seal system comprising
   a pipe;
   a ball in the pipe: a hollow seal section comprising:
      an inflatable seal comprising
         a port; and
         a mass attached to the inflatable seal; and
      a retaining profile comprising
         a seat:
   wherein the inflatable seal is characterized by:
      an uninflated condition in which the mass is separated from the ball; and
         the mass is separated from the seat of the retaining profile;
         wherein the ball is free to move unrestricted along the pipe; and
      an inflated condition in which the mass is between the ball and the seat of the retaining profile.

2. The seal system of claim 1, wherein the hollow seal section is of an annular shape; and wherein the inflatable seal is characterized by the inflated condition in which the mass contacts the ball and the mass contacts the seat of the retaining profile.

3. The seal system of claim 1, wherein the ball is a solid ball.

4. The seal system of claim 1, wherein the inflatable seal is characterized by the inflated condition in which the mass holds the ball in place and fluid flow along the pipe is blocked.

5. The seal system of claim 1, wherein the inflatable seal is characterized by the inflated condition in which a majority portion of load on the ball against fluid pressure is from the mass.

6. The seal system of claim 1, wherein the inflatable seal is characterized by the inflated condition in which a pressure in the inflatable seal is smaller than a pressure in the pipe.

7. The seal system of claim 1, wherein compressed fluid enters or leaves the inflatable seal through the port.

8. The seal system of claim 1, wherein the retaining profile holds the inflatable seal in place; and wherein the inflatable seal is characterized by the inflated condition in which the mass contacts the ball and the mass contacts the seat of the retaining profile.

9. The seal system of claim 1, wherein the ball is a hollow ball.

10. The seal system of claim 1, wherein a cross-section of the mass is of a circular shape.

11. The seal system of claim 1, wherein the ball is a solid ball or a hollow ball.

* * * * *